(12) United States Patent
Irissou et al.

(10) Patent No.: US 6,233,165 B1
(45) Date of Patent: May 15, 2001

(54) POWER CONVERTER HAVING A LOW VOLTAGE REGULATOR POWERED FROM A HIGH VOLTAGE SOURCE

(75) Inventors: Pierre R. Irissou, Sunnyvale; Hans R. Camenzind, Los Altos, both of CA (US)

(73) Assignee: ASIC Advantage, Inc., Sunnyvale, CA (US)

( * ) Notice: Subject to any disclaimer, the term of this patent is extended or adjusted under 35 U.S.C. 154(b) by 0 days.

(21) Appl. No.: 09/570,658

(22) Filed: May 15, 2000

(51) Int. Cl.[7] .................................................. H02M 3/335
(52) U.S. Cl. ........................................... 363/97; 363/21.07
(58) Field of Search ............................... 363/20, 21, 97, 363/131

(56) References Cited

U.S. PATENT DOCUMENTS

| | | | |
|---|---|---|---|
| 5,014,178 | * | 5/1991 | Balakrishnan ........................ 363/97 |
| 5,313,381 | * | 5/1994 | Balakrishnan ........................ 363/131 |
| 5,424,932 | * | 6/1995 | Inou et al. ............................ 363/21 |
| 5,621,623 | * | 4/1997 | Kuriyama et al. ..................... 363/20 |
| 5,812,383 | * | 9/1998 | Majid et al. .......................... 363/21 |
| 5,828,558 | * | 10/1998 | Korcharz et al. ..................... 363/20 |
| 5,862,044 | * | 1/1999 | Shioya et al. ......................... 363/21 |
| 6,078,510 | * | 6/2000 | Spampinato et al. ................. 363/21 |
| 6,122,180 | * | 9/2000 | Seo et al. ............................. 363/21 |
| 6,130,826 | * | 10/2000 | Matsumoto .......................... 363/20 |

* cited by examiner

Primary Examiner—Jeffrey Sterrett
(74) Attorney, Agent, or Firm—Girard & Equitz LLP

(57) ABSTRACT

A power supply arrangement including a transformer and a switching element coupled to a primary winding of the transformer and a power supply. The power supply includes a capacitor having a first terminal coupled to a junction of the primary winding and the switching element and a first diode coupled between the capacitor and an output node. The power supply further includes a discharge element, such as a resistor or a diode, coupled between the junction of the first diode and the capacitor and a power supply common. A voltage regulator, such as a Zener diode, is connected to the output node to produce a regulated voltage powered by the voltage applied to the transformer primary winding, with the regulated voltage being used to power the control circuitry.

27 Claims, 3 Drawing Sheets

POWER CONVERTER HAVING A LOW VOLTAGE REGULATOR POWERED FROM A HIGH VOLTAGE SOURCE

BACKGROUND OF THE INVENTION

1. Field of the Invention

The present invention relates generally to power supplies and, in particular, to power supplies suitable for operating from a high voltage supply input and for powering low-voltage-rated circuitry.

2. Description of the Related Art

In many applications where high voltages must be regulated or otherwise controlled in some manner, the circuitry for controlling the high voltages must be constructed to withstand high voltages. Since components with a high break-down voltage are expensive when compared to components with lower break-down voltages, there is an advantage is using low break-down voltage components.

FIG. 1 is a diagram of a conventional switching voltage regulator circuit which controls operation of a high voltage, but which uses low break-down voltage components. Further details regarding the construction and operation of the FIG. 1 circuit are disclosed in U.S. Pat. No. 5,313,381 entitled "Three-Terminal Switched Mode Power Supply Integrated Circuit".

As shown in FIG. 1, an AC supply of typically 110 to 120 volts at 50 or 60 Hz is applied to the input of a full wave bridge rectifier BR. One terminal of the output of rectifier BR, which is smoothed somewhat by a capacitor CF, is connected to the primary winding P1 of a transformer T1. Current flow through the primary winding is controlled by an integrated circuit switching circuit 16 which includes a control circuit 14 and a high voltage FET F1. This switching causes an AC component to be introduced so that voltages will be produced at the transformer secondary windings Si and S2. FET F1 can be implemented in discrete form or, together with control circuit 14, as an integrated circuit.

Control circuit 14 includes pulse width modulation (PWM) circuitry which causes FET F1 to periodically switch on and off at a frequency much higher than that of the AC input frequency. Thus, transformer T1 can be made relatively small. Secondary winding S1 is connected to a diode rectifier DA and filter capacitor CA. The DC output produced across capacitor CA is the primary DC power source to be regulated.

An error amplifier 12 compares the DC output with a reference voltage and produces an output based upon the comparison. The error amplifier output drives the input of an opto-coupler 18 which provides electrical isolation between the primary winding P1 circuitry and the circuitry connected to the secondary winding S1. The output of the opto-coupler 18 is thus indicative of the magnitude of the DC output voltage relative to the desired regulated voltage. The opto-coupler output is used to control pulse width modulation circuitry of control circuit 14 so that the duty cycle of the current flow through the primary winding P1 will either increase or decrease thereby altering the magnitude of the DC output voltage.

The switching circuit 16, which forms part of the primary winding P1 circuitry, typically must be powered by a source which is electrically isolated from the secondary winding circuitry S1. A dedicated secondary winding S2 is provided having a rectifier diode DB and filter capacitor CB. The DC output Vbias is connected to the output of the opto-coupler 18. The opto-coupler 18 is conductive a sufficient time to ensure that a capacitor CC remains charged to a voltage Vp. A regulator internal to controller 16 operates to provide an internal regulated voltage from voltage Vp for powering the integrated circuit controller 16. Vp is modulated by error amplifier 12, with the modulation information being used by the pulse width modulation circuitry in control circuit 14 to control the duty cycle of the primary winding P1 current and thus the magnitude of the regulated DC output voltage.

When FET F1 turns off, the inductance of the transformer primary P1 will attempt to maintain a constant current, with the result being that the voltage across the primary abruptly reverses. The drain of FET F1, which is connected to the primary, will increase to a voltage which could easily reach twice the supply voltage. This increase in voltage is due to the combination of leakage inductance and reflected voltage of the secondary winding. Although FET F1 is typically rated to withstand relatively high voltages, as opposed to the components which make up control circuit 14, the FET could be damaged by the very high voltages which could be produced on winding P1.

In order to prevent damage to FET F1 and related circuitry, circuits commonly referred to as a snubber network are typically used in applications such as shown in FIG. 1. FIG. 2 is a diagram of a conventional snubber network which can be used with the FIG. 1 regulator and which limits the voltage across the primary Pi. When FET F1 turns off, the drain voltage will increase in value until the voltage is greater than the supply voltage +V. Diode DC will begin to conduct so that capacitor CD will begin to become charged through resistor RB. Thus, depending upon the values of capacitor CD and resistor RB, the voltage excursion at the drain of F1 is limited to perhaps 50 to 100 volts above the supply voltage +V. Resistor RA operates to discharge capacitor CD after the fly-back pulse has exhausted itself.

Referring again to FIG. 1, the magnitude of the supply voltage VP can be set to a relatively low value by selecting the number of turns in secondary winding S2. Thus, with the exception of transistor F1, the remainder of the circuit controller 16 can be implemented using low voltage circuitry and/or electrical components. However, transformer T1 must include a secondary winding S2 dedicated to producing the supply voltage for the circuit controller 16 while maintaining the necessary electrical isolation from the circuitry powered by the primary DC output voltage by winding S1. Thus, the cost and size of transformer T1 are increased.

The present invention overcomes the above-noted shortcomings of the prior art by providing a low voltage output without the use of a dedicated secondary winding. The low voltage output can be powered by the voltage applied to the transformer primary so that electrical isolation is maintained. Further, the components used in implementing the invention can be made to carry out the snubber network function of FIG. 2. These and other advantages of the present invention will become apparent to those skilled in the art upon a reading of the following Detailed Description of the Invention.

SUMMARY OF THE INVENTION

A power supply arrangement and related method are disclosed. A transformer is provided having a first terminal of a primary winding connected to a power source. A switching element, such as a transistor, is coupled between a second terminal of the primary winding and a power source common, and operates to switch the power source output. A power supply is provided, which in a preferred embodiment, operates to power control circuitry which controls the state of the switching element.

The power supply includes a first capacitor, having a first terminal coupled to the second terminal of the primary winding, and a diode having an anode coupled to a second terminal of the capacitor and a cathode coupled to a first node. A discharge element, such as a resistor or a diode, is coupled intermediate the anode of the diode and the power source common. A voltage regulator, such as a Zener diode, is coupled to the first node and configured to regulate a power supply output voltage. In the event a Zener diode or other shunt regulator is used, the first node operates as the power supply output. In the event a series pass or similar type of regulator is used, the power supply output is at a node separate from the first node.

DETAILED DESCRIPTION OF THE INVENTION

Figure 3:
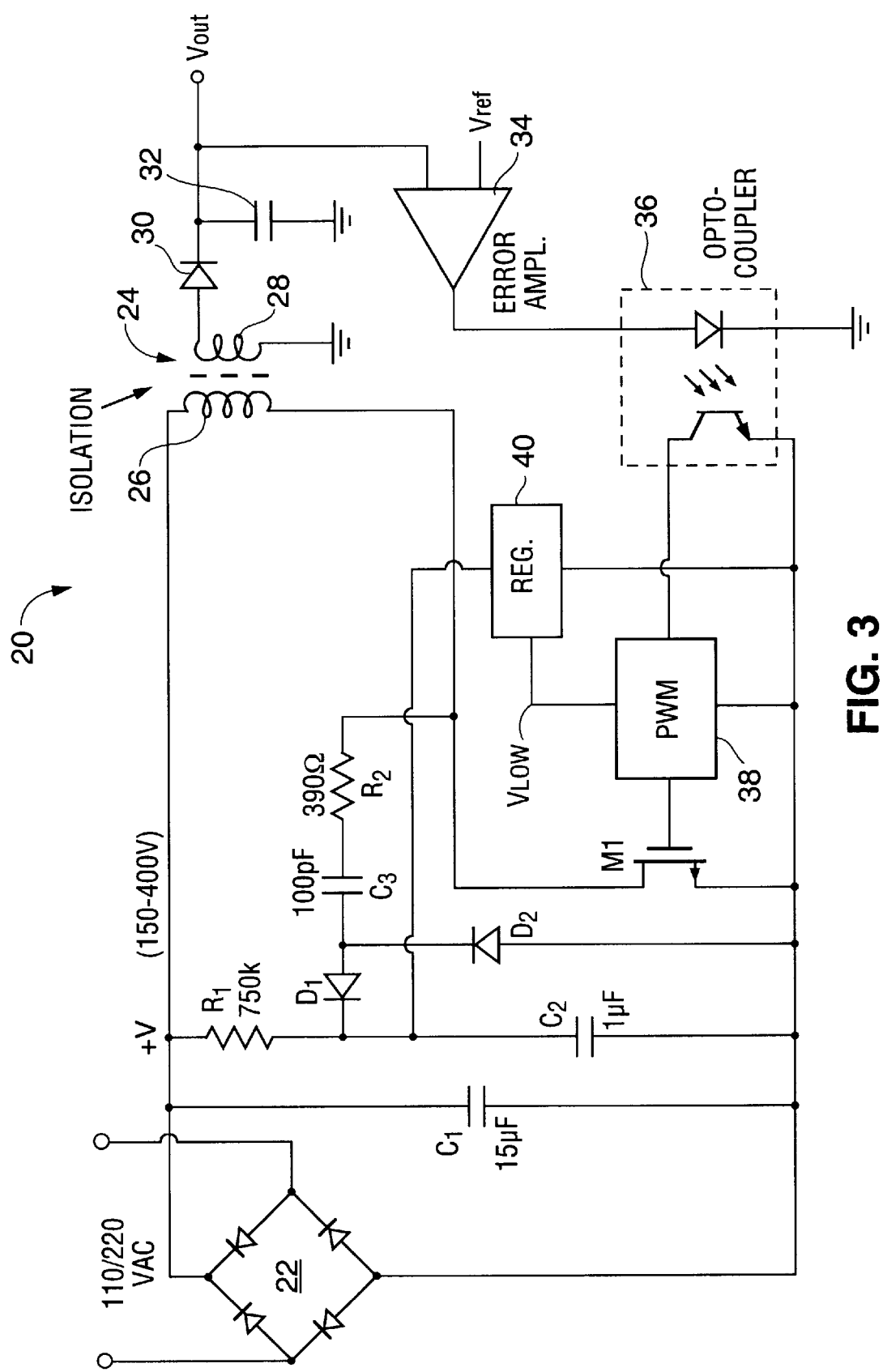
FIG. 3 is a schematic diagram of one embodiment of the present invention.

Referring again to the drawings, FIG. 3 is a switching voltage regulator circuit 20 which incorporates one embodiment of the present invention. The regulator circuit 20 is powered from a 110/220 V AC source which is rectified by a full wave rectifier 22. The output of rectifier 22 is filtered to some extent by capacitor C1 so that the output +V is a large and poorly regulated DC voltage having a large 50 Hz or 60 Hz ripple component.

Figure 1:
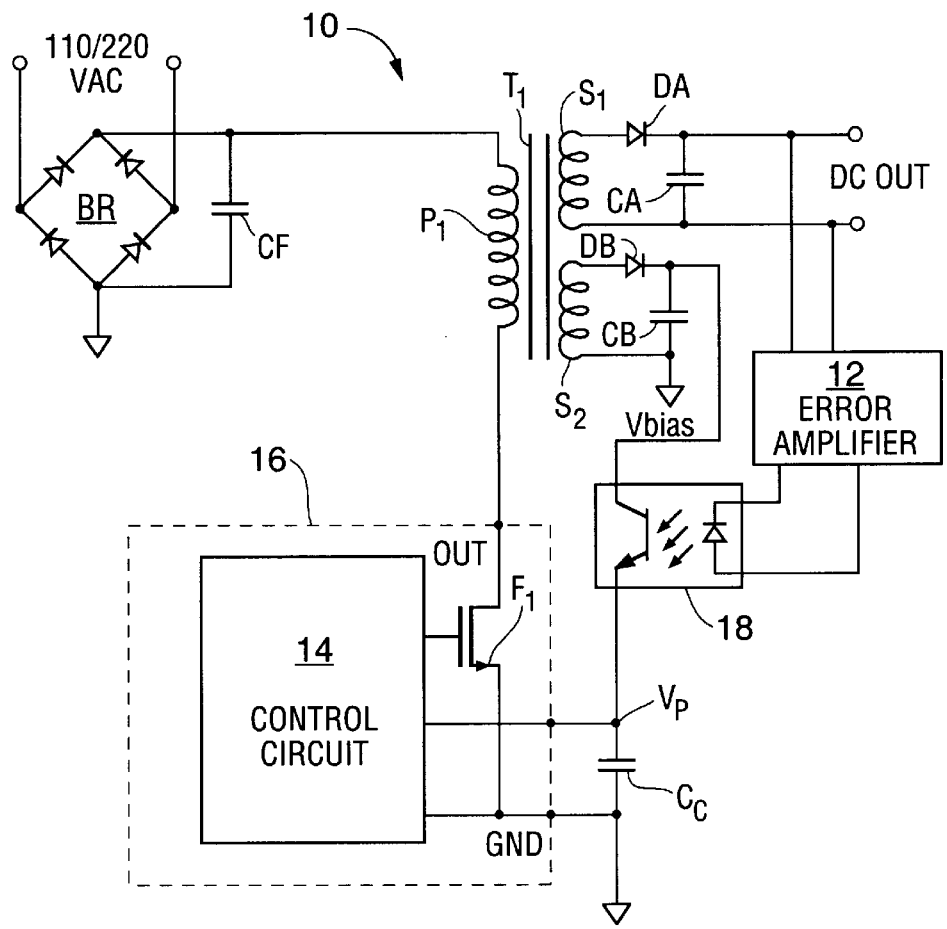
FIG. 1 is a schematic diagram of a prior art switching regulator.
Figure 2:
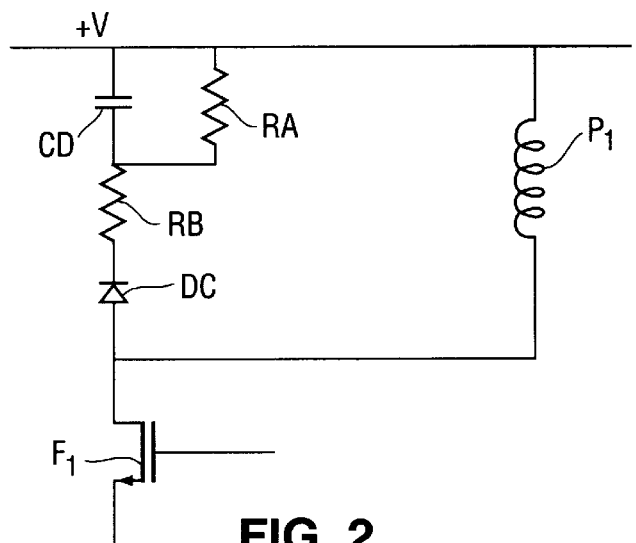
FIG. 2 is a schematic diagram of a prior art snubber network.

The positive side of the rectifier output is connected to one terminal of the primary winding 26 of a transformer 24. The negative side of the rectifier output is connected to a node sometimes referred to as the power source common. Further, the second terminal of primary winding 26 is connected to the drain of a high voltage FET M1. FET M1 operates to chop the DC voltage in a manner similar to that previously described in connection with FIG. 1.

A secondary winding 28 of transformer 24 is connected to a rectifier circuit including diode 30 and to a filter capacitor 32. The DC output Vout is the output of the switching regulator circuit. An error amplifier 34 operates to compare Vout with reference voltage Vref. Depending upon the relative magnitude of Vout and Vref, the input of an opto-coupler 36 either conducts or fails to conduct current. The opto-coupler 36 output is connected to a modulating input of a pulse width modulator 38. Unlike the opto-coupler 18 of the FIG. 1 prior art regulator, the output of opto-coupler 36 is not used to power the pulse width modulator and related circuitry.

The output of modulator 38 is connected to the gate of FET M1 so that current flow through primary winding 26 is periodically interrupted. The output of the modulator typically switches at a frequency of around 100 KHz, with the duty cycle of the output being controlled by the output of opto-coupler 36. If the output voltage Vout is high relative to Vref, the duty cycle is reduced thereby reducing the average current flow through primary 26 which results in a drop in Vout. Conversely, if Vout is too small, the duty cycle is increased thereby increasing Vout.

The pulse width modulator 38 is powered by a regulator circuit 40 which is part of a low voltage power supply. The low voltage power supply is, in turn, powered by the output of rectifier bridge 22. The low voltage power supply produces a low voltage output $V_{LOW}$ which permits the pulse width modulator circuit 38 to be constructed using low breakdown voltage components or using an integrated circuit having a low breakdown voltage. The magnitude of voltage $V_{LOW}$ is determined by the size of the voltage needed to drive FET M1 and is typically around +10 volts.

The low voltage supply further includes a capacitor C3 having one terminal connected to the bottom side of the primary winding 26 by way of a resistor R2. Typically, capacitor C3 is about 100 pF and R2 is abut 390 ω. The low voltage supply further includes a diode D1 having an anode connected to the remaining terminal of C3, with the cathode being connected to the input of regulator circuit 40. A second diode D2, also part of the low voltage supply, is connected between diode D1 and the power source common, with the cathode of D2 being connected to the anode of diode D1. A 15 μF capacitors C1 is connected across the output of rectifier 22 and a 1 μF capacitor C2 is connected between the cathode of diode D1 and the power source common. Finally, a large resistor R1, typically 750 kω, is connected between the high voltage output of rectifier 22 and the input of regulator 40.

At start up, before FET M1 begins switching, filter capacitor C2 is charged by way of large resistor R1 to provided a short term operating voltage to regulator 40. Once modulator 38 and the associated circuitry begins to operate, FET M1 begins to switch. The resultant high-frequency square-wave output is fed to diode D1 by way of coupling capacitor C3 and resistor R2. Diode D1 thus rectifies the high-frequency output so as to provide DC voltage which is filtered by capacitor C2. When the square-wave output begins to drop in voltage, diode D1 becomes reverse biased thereby isolating the DC voltage from the high-frequency output. When the high-frequency output swings below the primary circuit common, diode D2 becomes forward biased and functions to clamp the high-frequency output near common. Thus, an unregulated low voltage is produced for powering regulator 40, with regulator 40 producing the output of the low voltage supply, $V_{LOW}$. Note that if regulator 40 is a shunt regulator, such as a Zener diode, the input and the output of the regulator are the same, with $V_{LOW}$ also appearing at the input of the regulator.

When FET M1 turns off, the voltage at the primary winding 26 connected to M1 will tend to increase to a value which can be much greater than the voltage at the rectifier 22 output. An important aspect of the present invention is that the circuitry which operates to produce voltage $V_{LOW}$ also provides a snubber network function. When the primary winding voltage at FET M1 increases above the voltage across capacitor C2, diode D1 becomes forward biased, with current flowing through resistor R2, capacitor C3 and diode D1 into capacitor C2. This causes energy in the primary winding 26 to be dissipated in resistor R2 thereby reducing the magnitude of the voltage excursion. When Ml turns back on, capacitor C3 is discharged through diode D2. Thus, a snubber network function is provided without the need for additional components. Note that if the snubber network function is not desired, resistor R2 can be deleted. In any event, resistor R2 should be smaller that 5 Kω, and preferably much closer to a few hundred ohms so as to minimize power dissipation.

Figure 4:
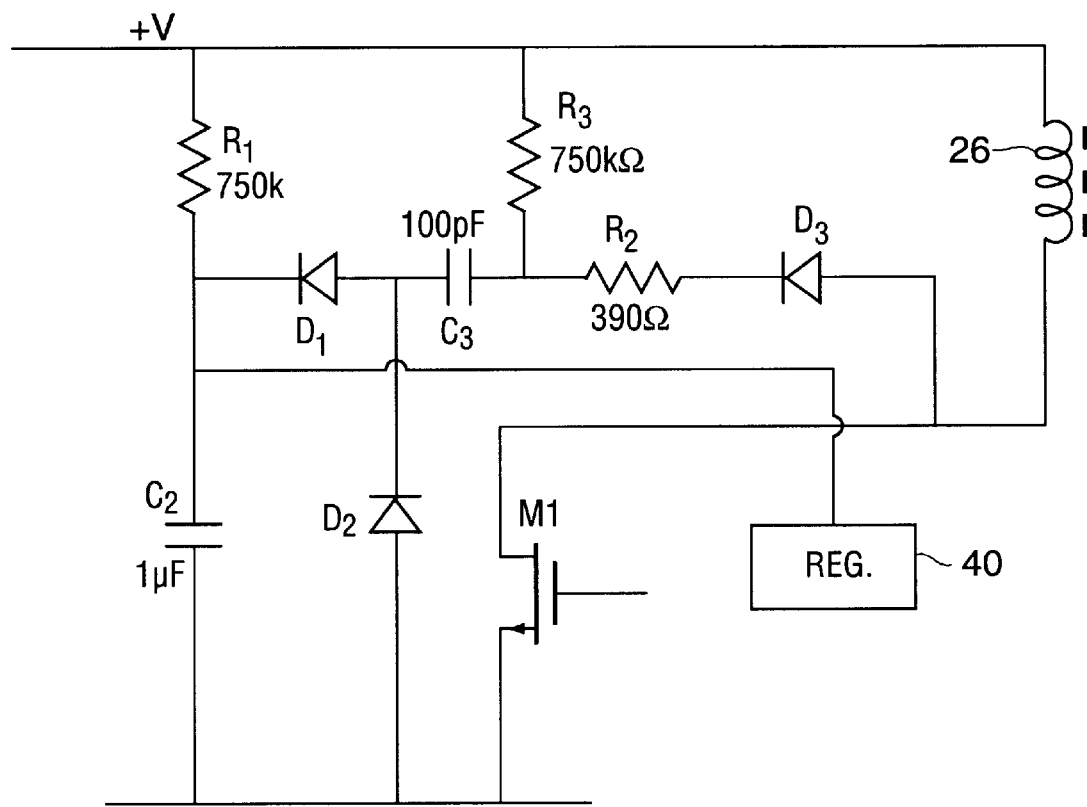
FIG. 4 is a partial schematic diagram of a second embodiment of the present invention.

The voltage across resistor R2 ranges from zero volts to a value approaching 50 to 100 volts above +V. This requires that resistor R2 be capable of fairly high power operation. FIG. 4 is a partial schematic diagram of a further embodiment of the present invention where the power rating of resistor R2 is substantially lower than that of the FIG. 3 embodiment. The circuitry of the FIG. 4 embodiment is the same as that of FIG. 3 with the exception of the addition of a diode D3 connected in series with resistor R2 and an additional resistor R3 connected between the junction of resistor R2 and capacitor C3 and the high voltage output of rectifier 22. The voltage at the terminal of R2 connected to diode D3 continues to switch between the primary circuit common and 50 to 100 volts above +V. However, resistor R3 in combination with diode D3 maintains the voltage at the junction of R2 and C3 at a minimum value of +V. Thus, the maximum voltage drop across resistor R2 is reduced by an amount equal to +V.

Figure 5:
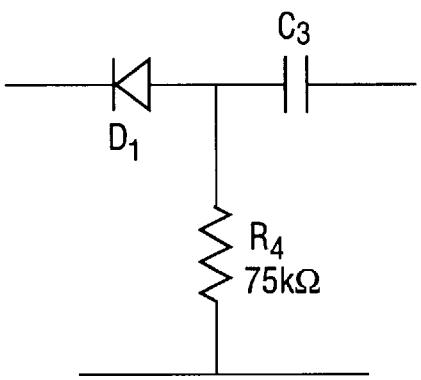
FIG. 5 is a modification of the FIG. 4 embodiment.

As previously noted, the voltage at the junction of R2 and C3 will momentarily exceed the value of +V by 50 to 100 volts. Capacitor C3 is discharged through a current path defined by diode D2 and resistor R3, with the time required for the discharge being relatively large due to the presence of high value resistor R3 (750 kohm). In that case, diode D2 can be replaced with a resistor R4 to carry out the discharge function as shown in FIG. 5. Typically, the value of the discharge resistor R4 is 1/10 of that of R3, 75K ohm in this case.

Thus, various embodiments of a power supply capable of operating from a high voltage input and providing a low voltage output have been disclosed. Although these embodiments have been described in some detail, certain changes can be made by those skilled in the art without departing from the spirit and scope of the invention as defined by the appended claims.

What is claimed is:

1. A power converter arrangement comprising:
   a transformer which includes a primary winding having a first terminal coupled to a power source input;
   a switching element coupled between a second terminal of the primary winding and a power source common; and
   a power supply including
   (a) a first capacitor having a first terminal coupled to the second terminal of the primary winding;
   (b) a first diode having an anode coupled to a second terminal of the first capacitor and a cathode coupled to a first node;
   (c) a discharge element coupled intermediate the anode of the first diode and the power source common;
   (d) a voltage regulator coupled to the first node and configured to regulate a voltage at a power supply output.

2. The power converter arrangement of claim 1 further including control circuitry configured to control a state of the switching element, with the control circuitry being coupled to the power supply output so that the control circuitry is powered by the power supply.

3. The power converter arrangement of claim 2 wherein the power supply further includes a first resistor coupled in series with the first capacitor.

4. The power converter arrangement of claim 3 wherein the power supply further includes a second resistor, having a resistance substantially larger than the first resistor, which is coupled intermediate the first terminal of the primary winding and the first node.

5. The power converter arrangement of claim 4 wherein the power supply further includes a second capacitor coupled intermediate the first node and the power source common.

6. The power converter arrangement of claim 3 wherein the transformer includes a secondary winding, a rectifier circuit coupled to the secondary winding and an error circuit configured to produce a control signal indicative of a magnitude of a voltage produced at an output of the rectifier circuit, with the control signal being coupled to the control circuit so that the control circuit controls the state of the switching element in response to the control signal.

7. The power converter arrangement of claim 6 further including an isolated coupler configured to couple the control signal to the control circuit while maintaining electrical isolation between the secondary winding and the control circuit.

8. The power converter arrangement of claim 7 wherein the isolated coupler includes an optical coupler.

9. The power converter arrangement of claim 1 wherein the discharge element includes a diode.

10. The power converter arrangement of claim 1 wherein the power supply further includes a first resistor coupled in series with the first capacitor and a second resistor coupled intermediate the first terminal of the first capacitor and the first terminal of the primary winding.

11. The power converter arrangement of claim 10 wherein the power supply further includes a second diode connected in series with the first resistor.

12. The power converter arrangement of claim 11 wherein the discharge element includes a diode having an anode coupled to the power source common.

13. The power converter arrangement of claim 11 wherein the discharge element includes a third resistor having a resistance substantially smaller than a resistance of the second resistor.

14. A power converter arrangement comprising:
   a transformer which includes a primary winding coupled to a power source input;
   a switching element which periodically interrupts current flow through the primary winding; and
   a power supply including
   (a) a first rectifier element with an input terminal and an output terminal, with the output terminal of the first rectifier element being coupled to a first node;
   (b) a first capacitor coupled intermediate the input terminal of the first rectifier element and the primary winding;
   (c) a discharge element coupled to the input terminal of the first rectifier element;
   (d) a voltage regulator coupled to the first node and configured to regulate a voltage at a power supply output.

15. The power converter arrangement of claim 14 further including a first resistor connected in series with the first capacitor.

16. The power converter arrangement of claim 15 further including a second resistor, having a resistance substantially larger than a resistance of the first resistor, coupled intermediate the power source and the first node.

17. The power converter arrangement of claim 15 further including a second capacitor coupled to the first node.

18. The power converter arrangement of claim 15 further including control circuitry configured to control a state of the switching element, with the control circuitry being coupled to the power supply output so that the control circuitry is powered by the power supply.

19. The power converter arrangement of claim 18 the transformer further includes a secondary winding and wherein the control circuitry controls the state of the switching element so as to produce a desired output voltage at the secondary winding.

20. The power converter arrangement of claim 14 wherein the first rectifier element and the discharge element include first and second diodes, respectively.

21. The power converter arrangement of claim 14 wherein the power supply further includes a first resistor coupled intermediate the first capacitor and the primary winding, a second rectifier element with an input terminal and an output terminal, with the input terminal of the second rectifier element being coupled to a first terminal of the primary winding and the output terminal being coupled to the first resistor.

22. The power supply arrangement of claim 21 further including a second resistor coupled intermediate a node at a junction of the first capacitor and the first resistor and a second terminal of the primary winding.

23. The power converter arrangement of claim 22 wherein the discharge element includes a third resistor having a resistance substantially smaller than a resistance of the second resistor.

24. The power converter arrangement of claim 22 wherein the discharge element includes a diode.

25. A method of producing a DC output voltage from a power source comprising:
   coupling a power source output to a first node by way of a first capacitor;
   rectifying a voltage produced at the first node to produce a rectified voltage at a second node;
   regulating the voltage at the second node to a predetermined DC output voltage;
   powering a control circuit by way of the second node; and
   using the control circuit to control a switching element which operates to introduce an AC component to the power source output.

26. The method of claim 25 further including powering the control circuit from the power source output prior to the powering a control circuit by way of the second node.

27. The method of claim 25 the using the control circuit includes coupling the power source output to a primary winding of a transformer, producing a control signal related to a voltage produced at a secondary winding of the transformer and controlling the control circuit in response to the control signal.

* * * * *